United States Patent [19]

Schreuder

[11] Patent Number: 4,646,092
[45] Date of Patent: Feb. 24, 1987

[54] METHOD OF AND APPARATUS FOR CONTINUOUS WAVE ELECTROMAGNETIC DISTANCE MEASUREMENT OF POSITIONING

[75] Inventor: Jan Schreuder, Cape Town, South Africa

[73] Assignee: Plessey South Africa Limited, Cape Town, South Africa

[21] Appl. No.: 498,469

[22] Filed: May 26, 1983

[30] Foreign Application Priority Data

Jun. 7, 1982 [ZA] South Africa ............... 82/3985

[51] Int. Cl.$^4$ ........................................... G01S 13/84
[52] U.S. Cl. .................................... 342/125; 342/127
[58] Field of Search ...................................... 343/12 R

[56] References Cited

U.S. PATENT DOCUMENTS 3,315,257 4/1967 Sauberlich ................. 343/12 R
4,307,397 11/1978 Hölscher .................... 343/12 R

FOREIGN PATENT DOCUMENTS 1295040 4/1962 France.
2011750 7/1979 United Kingdom.

OTHER PUBLICATIONS

Cubic Corporation; Model CR-100 Series Precision Range/Range Rate Measurement System; Aug. 1978.
Cubic Corporation; Ku-Band Precision Distance Measuring Equipment.
Deck Article—Mecanique, Materiaux, Electricite, vol. 55, No. 279, Mar. 1973, pp. 18–22.
Cubic Corporation Brochure—Precision Ranging System.
European Search Report issued on European Patent Appln. 83303224.

Primary Examiner—T. H. Tubbesing
Assistant Examiner—Gilberto Barrón, Jr.
Attorney, Agent, or Firm—Ladas & Parry

[57] ABSTRACT

In a continuous wave electromagnetic positioning or distance measuring system of the Wadley type (see U.S. Pat. No. 2,907,999) a number of secondary phase measurements are obtained from a number of successively produced primary phase measurements in such a manner that any instrumental errors incorporated in the primary phase measurements are eliminated. Each secondary phase measurement represents the fractional part of the phase delay that would be experienced by a signal of accurately known measuring frequency when propagated electromagnetically along a propagation path corresponding in length to the distance to be measured. The measuring frequency is determined by the frequencies of pattern and auxiliary pattern signals used in obtaining the primary phase measurements. By suitable choice of the measuring frequencies, the distance can then be derived from the phase measurements, the result being unambiguous to the wavelength of the lowest measuring frequency and being accurate to a fraction of the wavelength of the highest measuring frequency. The system is ideal under static conditions where the distance does not change during the measuring sequence. Under dynamic conditions, where the distance changes during the measuring sequence, problems arise. Heretofore, the multiplying factor $\beta$ which relates one measuring frequency to the next higher measuring frequency was chosen to be as small as possible with what were considered to be reasonable averaging times for the individual primary phase measurements, and the problems arising under dynamic conditions were dealt with by decreasing the highest measuring frequency. The resultant loss in accuracy was accepted as inevitable. In the present invention the factor is increased so as to be in the range $1 > \beta > \frac{1}{8}$. This reduces the accuracy requirement for the phase measurements, permitting a reduction in the averaging times, and consequently reducing the effect of distance changes during the measuring operation. The superiority of this approach stems from the quadratic relationship between the reduction in averaging times and the loss in accuracy, noise conditions being equal.

10 Claims, 3 Drawing Figures

METHOD OF AND APPARATUS FOR CONTINUOUS WAVE ELECTROMAGNETIC DISTANCE MEASUREMENT OF POSITIONING

FIELD OF THE INVENTION

This invention relates to a continuous wave electromagnetic distance measuring or positioning system. More particularly, it relates to a method of continuous wave electromagnetic distance measurement or positioning, and to apparatus for use in such method.

BACKGROUND OF THE INVENTION

The invention relates in particular to a system in which the method of distance measurement or positioning employed comprises:

obtaining successively a series of primary phase measurements, each primary phase measurement being obtained by:
generating a pattern signal having an accurately known pattern frequency;
generating an auxiliary pattern signal having a frequency which differs from the pattern frequency by a predetermined off-set frequency;
causing at least the pattern signal to be propagated electromagnetically;
mixing the pattern signal and the auxiliary pattern signal with one another before and after said propagation, thereby to provide two comparison signals each having a frequency equal to the off-set frequency; and
carrying out a phase measuring operation on the two comparison signals to provide said primary phase measurement as the phase difference between the two comparison signals; and combining the primary phase measurements of each of a plurality of selected pairs of the primary phase measurements in such a manner as to produce a secondary phase measurement in which any instrumental phase error incorporated in the respective primary phase measurements is substantially eliminated, each secondary phase measurement corresponding to a measuring frequency which is determined by the pattern and auxiliary pattern frequencies at which the primary phase measurements of the respective pair are obtained;

the pattern and auxiliary pattern frequencies and the manner in which the primary phase measurements are combined being selected in such a manner that the distance can be derived from the secondary phase measurements unambiguously to the wavelength of the lowermost measuring frequency and to an accuracy equal to a fraction of the wavelength of the highest measuring frequency.

Said propagation usually takes place as modulation of a suitable, electromagnetically propagated carrier wave. Carrier waves of a relatively high frequency are normally used, as these permit collimation into narrow beams, and as their speed of propagation is not, to any significant extent, affected by ground conductivity.

Such a system is, for example, described in U.S. Pat. No. 2,907,999 to Wadley and is herein also referred to as a system of the Wadley type.

As disclosed in the above Wadley patent, the Wadley system can be used to measure the distance between two stations, or, in positioning a station, to determine the difference in distance of that station to two other stations, thereby locating that station on a hyperbolic locus having the two other stations as foci. Unless the context indicates otherwise, reference herein to distance measurement should be construed as including positioning of a station with respect to two or more other stations.

Although systems of the Wadley type are very advantageous as far as accuracy is concerned, they are disadvantageous as far as the speed of measurement is concerned. This is a drawback particularly in dynamic applications where a number of primary phase measurements are made not simultaneously but at different times.

In electromagnetic distance measuring systems generally, distance is essentially derived from the time it takes for a signal to be propagated electromagnetically along a propagation path corresponding in length to the distance to be measured. In continuous wave systems (such as the Wadley system), as opposed to pulse systems, the signal is a sine wave signal of accurately known frequency, and the time is, in effect, measured by determining the phase delay experienced by the signal in being propagated along the propagation path. Knowing the phase delay and the wavelength of the sine wave resulting from electromagnetic propagation of the signal, the distance can be determined.

To determine the phase delay, the phase of the signal before propagation is compared with the phase of the signal after propagation. This results in a phase measurement which represents only the fractional part of the phase delay. In other words, although a phase measurement at a particular frequency can be used to resolve the phase delay to a fraction of a whole phase rotation, it cannot be used to resolve the number (if any) of whole phase rotations. Mathematically, the distance to be measured (D) can be expressed as follows:

$$D = (n + \alpha)\lambda$$

Where
$\lambda$ = the effective wavelength of the continuous wave;
$\alpha$ = the phase measurement expressed as a fraction of a whole phase rotation; and
n = the unresolved number of whole phase rotations.

The effective wavelength is that length by which the distance D must be increased to increase the phase delay by one whole phase rotation.

n is also referred to as the ambiguity factor, and represents the ambiguities in D resulting from the unknown number of whole phase rotations.

The accuracy to which the distance D is required to be measured in practice is typically in excess of one part in $10^5$. However, there are limitations on the accuracy to which the phase measurement $\alpha$ can be made. In most situations, these limitations make it impossible to determine D to the requisite accuracy, with a phase measurement made at a frequency for which $\lambda$ is known to be greater than D (i.e. n=0). It is therefore usually necessary in continuous wave systems to obtain a phase measurement at each of a number of different frequencies, the highest frequency being selected to provide the requisite accuracy, and the lower frequencies being selected to resolve the ambiguities. Put in a different way, the lowest frequency is selected to provide a coarse but unambiguous measurement of the distance, and the higher frequencies are selected to upgrade the accuracy of the coarse measurement without introducing ambiguities.

In one particular form of the Wadley system (which is here described for purposes of illustration only), the highest pattern frequency is referred to as a reference pattern frequency or simply the reference frequency fPr, and the other pattern frequencies fP1, fP2, etc are selected in such a manner that they are related to the reference frequency as follows:

$$fM1 = fPr - fP1$$
$$fM2 = fPr - fP2, \text{ etc}$$

The reference frequency represents the highest measuring frequency, and fM1, fM2, etc represent the lower measuring frequencies.

The secondary phase measurement $\alpha Mr$ corresponding to the highest measuring frequency fPr is derived from two primary phase measurements $\alpha(\text{plus})$ and $\alpha(\text{minus})$, the first being obtained with the corresponding auxiliary pattern signal having a frequency higher than that of the reference frequency, and the second being obtained with the auxiliary pattern signal having a frequency lower than that of the reference frequency. The phase measurement $\alpha Mr$ is derived as follows:

$$\alpha Mr = \tfrac{1}{2}(\alpha(\text{plus}) - \alpha(\text{minus}))$$

The secondary phase measurements $\alpha M1$, $\alpha M2$, etc corresponding to the lower measuring frequencies fM1, fM2, etc are derived from the primary phase measurements $\alpha Pr$, $\alpha P1$, $\alpha P2$, etc obtained at the various pattern frequencies, as follows:

$$\alpha M1 = \alpha Pr - \alpha P1$$

$$\alpha M2 = \alpha Pr - \alpha P2, \text{ etc}$$

More generally, where the auxiliary pattern frequency for the one primary phase measurement is higher than the pattern frequency and for the other phase measurement lower than the pattern frequency, then the corresponding measuring frequency is equal to twice the pattern frequency where the pattern frequency remains the same, or equal to the sum of the two pattern frequencies where they differ. Where the auxiliary pattern frequencies for the two primary phase measurements are both higher than or both lower than the corresponding pattern frequencies, then the corresponding measuring frequency is equal to the difference between the two pattern frequencies.

As is known in the art, and as will be described hereinafter, derivation of the secondary phase measurements in this manner leads to the substantial elimination of instrumental phase errors.

By suitable selection of the various pattern frequencies it is then possible, from the secondary phase measurements $\alpha Mr$, $\alpha M1$, $\alpha M2$ etc., to determine the distance D unambiguously, to the requisite accuracy.

Mathematically, the relationship between the various measuring frequencies can be expressed as follows:

$$fM1 = \beta fPr$$

$$fM2 = \beta fM1$$

$$fM3 = \beta fM2, \text{ etc.}$$

where $\beta$ is a multiplying factor which need not necessarily be the same for each measuring frequency, but which is such that fM1 is lower than fPr, fM2 lower than fM1, and so on.

It will be appreciated that the various phase measurements $\alpha Pr$, $\alpha P1$, $\alpha P2$, etc can be obtained in any desired sequence.

The value of $\beta$ should not be smaller than twice the worst case error in $\alpha$ (expressed as a fraction of $\alpha$). If it is, then there is the risk that a breakdown in ambiguity resolution may occur.

The accuracy to which $\alpha$ can be determined is limited by inaccuracies introduced by transmission noise and inaccuracies introduced by multi-path reflections. Multi-path reflections are unwanted reflections of the carrier wave from objects (usually the ground) alongside the propagation path. The inaccuracies introduced by transmission noise, expressed as a fraction of $\alpha$, do not vary significantly with the wavelength $\lambda$ or with the carrier frequency, although they do vary with distance and propagation conditions (e.g. weather conditions). The inaccuracies introduced by multi-path reflections, being dependent on actual measuring conditions in the field, are basically unpredictable, and can only be assessed on a statistical basis from experience. Even in a simple case where only one multi-path reflection is present, the effect depends on many factors such as the shape, size and reflection coefficient of the reflecting surface, relative angle of polarisation of the signal relative to the reflecting surface, the excess pathlength of the reflection path, the pattern frequencies, the $\beta$ factor, and the carrier wave frequency. However, it has been found that where secondary phase measurements, each derived from the difference between two primary phase measurements obtained with the auxiliary pattern frequency in both cases being higher than or in both cases being lower than the corresponding pattern frequency, are used to resolve ambiguities as described above, the effect on the secondary phase measurements of multi-path errors that have equal chances of occurring for different $\beta$ factors, does increase with $\beta$, but less than proportionally. It has also been found that, with $\beta$ values of 0.1 as used in the majority of Wadley type surveying instruments, failure, as a result of multi-path errors, to resolve ambiguities, is rare. The effect of inaccuracies introduced by transmission noise can be reduced by averaging the phase measurement over a length of time, herein referred to as the averaging time. Such averaging does not, however, reduce the effect of inaccuracies introduced by multi-path reflections.

In previously proposed Wadley systems the $\beta$ factor was chosen to be as small as possible with what were considered resonable averaging times. Typically, $\beta$ factors of 0.1 for systems based on a microwave carrier were used. This required an averaging time in the order of 0.5 second per phase measurement in order to reduce the worst case error in $\alpha$ to below the required 0.05. Although such an averaging time is acceptable for static measurements, i.e. where the distance to be measured does not change significantly during the time interval between successive phase measurements (from the start of one phase measurement to the start of the next), problems arise when there is a substantial change in the distance during that time interval.

Where the rate of change of distance is constant, the problem can, to a certain extent, be overcome by making a phase measurement at the reference frequency fPr before and after a phase measurement at a pattern frequency fP1, fP2, etc, and by making use in the subsequent derivation of the secondary phase measurement, of the average of the two phase measurements at the reference frequency. This technique is also referred to as straddle measuring or sandwich measuring. This method of eliminating the effect of a changing distance rapidly fails if the rate of change itself changes, e.g. if the distance to an overflying aircraft is being measured. Even where the rate of change of distance does remain constant, there is a limit beyond which the technique of straddle measuring leads to ambiguous results. This limit is exceeded when, during the time interval between two successive phase measurements at the reference frequency, the distance changes by more than $\frac{1}{2}\lambda$ of the reference pattern signal. In a typical system designed for static conditions, where the wavelength of the reference frequency is 10 m, and the averaging time which is required to reduce the worst case error in $\alpha$ to less than 0.05 is 1 second, ambiguity resolution of the system would break down when the distance to be measured changes at a rate of more than 0.5 m/sec or about 1.8 m/h. If the straddle or sandwiching technique were used, this would increase to 2.5 m/sec or 9 km/h. This is assuming that the rate of change is constant. Quite clearly such a system would not be suitable for accurately measuring the distance to even a slow-moving station such as a ship—let alone a fast-moving station such as an aircraft.

In previously proposed Wadley systems, the problem has been dealt with by reducing the averaging times as far as possible without reducing the maximum range specifications unduly, and mainly by increasing the wavelength of the reference frequency—typically to 100 m or more. The ratio of speed to wavelength decreases as the wavelength is increased, so that the effect on $\alpha$ of changes in distance with respect to time decreases in proportion to the increase in wavelength. The accompanying loss in accuracy was accepted as inevitable.

It is an object of the present invention to provide a continuous wave electromagnetic distance measuring system of the Wadley kind, which is better able to deal with the measurement of a changing distance. It is also an object of the invention to provide such a system which is able to provide an increased measuring speed and/or resolution of distance and which is less sensitive to errors introduced by multi-path reflections.

SUMMARY OF THE INVENTION

According to the invention there is provided a method of continuous wave electromagnetic distance measurement or positioning in accordance with the Wadley system as defined broadly above, the method being characterised thereby that the pattern and auxiliary pattern frequencies and the manner in which the primary phase measurements are combined are selected in such a manner further that at least one of said measuring frequencies (other than the highest) is related to the next higher measuring frequency by a multiplying factor $\beta$ which lies within the following range:

$$1 > \beta > \tfrac{1}{4}.$$

The pattern and auxiliary pattern frequencies and the manner in which the primary phase measurements are combined may be selected in such a manner that substantially all of said measuring frequencies (other than the highest) are each related to the next higher measuring frequency by a multiplying factor $\beta$ which lies within said range.

The multiplying factor $\beta$ may lie within the following range:

$$1 > \beta \geq \tfrac{1}{2}.$$

The multiplying factor $\beta$ may be equal to $\tfrac{1}{2}$.

Where each primary phase measurement is obtained as an average value over an averaging time, the averaging time for at least some of the primary phase measurements may be less than 75 ms, and preferably less than 40 ms.

The averaging time for each of substantially all the primary phase measurements may be less than 75 ms, and preferably less than 40 ms.

A rapid succession of phase measurements, each being of short duration, will reduce the change in distance which takes place between successive measurements. Due to the inevitable presence of noise, however, shorter averaging times will either reduce the accuracy of the phase measurements or reduce the maximum range. However, without reducing the maximum range, a reduction in the accuracy of the phase measurements can be tolerated if larger values of $\beta$ are used, and if the loss in accuracy of the phase measurement at the highest measuring frequency is compensated for by increasing the highest measuring frequency. Although an increase in the highest measuring frequency proportionally increases the effect which a change in distance has on the phase measurement at that frequency, there is nevertheless a net gain in the tolerance to changes in distance, the reason for this being that there is a square root relationship between the averaging time and the noise-related accuracy of a phase measurement. In other words, under given noise conditions, a fourfold decrease in the averaging time, for example, would result in only a twofold decrease in the noise-related accuracy of the phase measurements. Accordingly, it is not necessary to increase the highest measuring frequency in proportion to the decrease in averaging times in order to maintain the same accuracy.

Furthermore, as the effect of acceleration is a quadratic function of the time interval between phase measurements, a reduction of the averaging time leads to a dramatic increase in the tolerance to acceleration.

The invention also extends a continuous wave electromagnetic distance measuring or positioning apparatus which comprises:

control means;

first generating means responsive to the control means for generating a pattern signal having any selected one of a series of accurately known pattern frequencies;

second generating means responsive to the control means for generating an auxiliary pattern signal having a frequency which differs from the selected pattern frequency by a predetermined off-set frequency;

means for transmitting the pattern signal so as to be propagated electromagnetically;

means for receiving the pattern signal after said propagation;

means for mixing the pattern signal and the auxiliary pattern signal with one another before and after said propagation, thereby to provide two comparison signals each having a frequency equal to the off-set frequency; and means for carrying out a phase measuring operation on the two comparison signals to provide a primary phase measurement representative of the phase difference between the two comparison signals;

the control means being operative:
to cause the first generating means to generate successively a plurality of pattern signals each having a selected one of said pattern frequencies, and to cause the second generating means to generate the corresponding auxiliary pattern signal;

to combine the primary phase measurements of each of a plurality of selected pairs of the resulting primary phase measurements in such a manner as to produce a secondary phase measurement in which any instrumental phase error incorporated in the respective primary phase measurements is substantially eliminated, each secondary phase measurement corresponding to a measuring frequency which is determined by the pattern and auxiliary pattern frequencies at which the primary phase measurements of the respective pair are obtained;

to select the pattern and auxiliary pattern frequencies and the manner in which the primary phase measurements are combined in such a manner that the distance can be derived from the secondary phase measurements unambiguously to the wavelength of the lowest measuring frequency and to an accuracy equal to a fraction of the wavelength of the highest measuring frequency; and to select the pattern and auxiliary pattern frequencies and the manner in which the primary phase measurements are combined in such a manner further that at least one of said measuring frequencies (other than the highest) is related to the next higher measuring frequency by a multiplying factor $\beta$ which lies within the following range:

$$1 > \beta > \tfrac{1}{2}.$$

The control means may be a suitably programmed data processor, e.g. a micro-processor.

BRIEF DESCRIPTION OF THE DRAWINGS

The invention will now be described in more detail, by way of example, with reference to the accompanying drawings.

In the drawings.

DETAILED DESCRIPTION OF THE DRAWINGS

Figure 1:
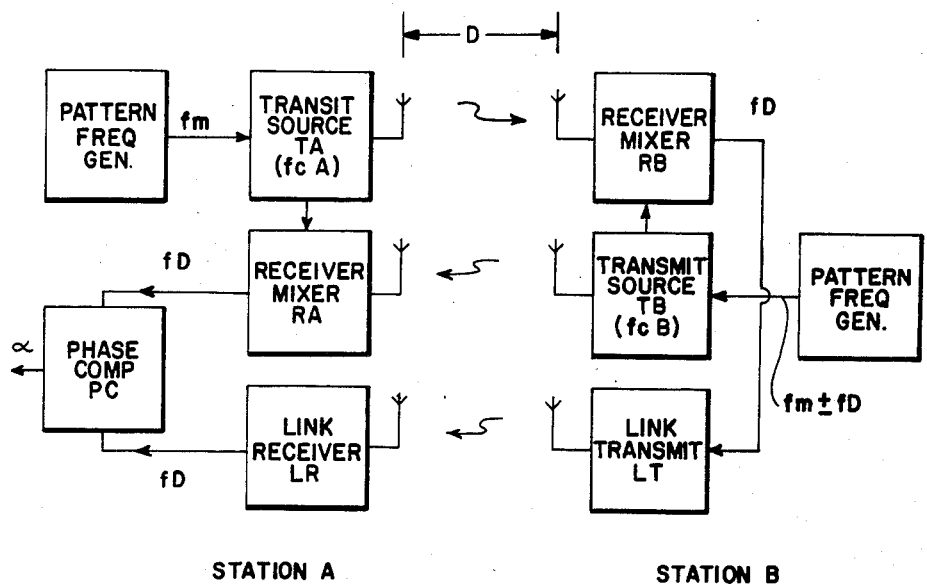
FIG. 1 shows, in block diagram form, one type of continuous wave electromagnetic distance measuring system suitable for operation in accordance with the invention.

The systems illustrated in the drawings are both variations of the Wadley system.

Referring first to FIG. 1, the distance D to be measured extends between two stations, namely station A and station B. At each station there is located an instrument which is able to transmit and to receive a signal, and measurements take place by interaction between, on the one hand, a signal generated at station A and a signal transmitted to station A from station B, and, on the other hand, between a signal generated at station B and a signal transmitted to station B from station A. The signals are transmitted as modulation of a carrier wave of relatively high frequency, e.g. a microwave carrier or a light wave carrier.

At station A there is a transmitting source TA which produces and transmits a carrier signal at frequency fcA, frequency modulated by a pattern frequency fm, and a receiver mixer RA for receiving the signal transmitted from station B. The receiver mixer RA is biased by a fraction of the output of the transmitting source TA, to produce intermodulation products between the signal received from station B and the signal provided by the local oscillator bias, i.e. by the transmitting source TA. At station B there is a transmitting source TB which produces and transmits a carrier signal at frequency fcB, frequency modulated by an auxiliary pattern frequency fm±fD, fD being a small frequency offset relative to the frequency fm. There is also a receiver mixer RB, local oscillator biased by a fraction of the output of the transmitting source TB, to produce intermodulation products between the local oscillator bias and the signal received from station A. In both the receiver mixers RA and RB an intermediate frequency (IF) signal having a frequency fcA-fcB, modulated by sidebands at ±fD and other sidebands of ±fm or higher frequencies, is formed. By filtering, the higher frequency sidebands are removed, leaving the (fcA−fcB)±fD sidebands only, together with the IF frequency (fcA−fcB). After amplification and demodulation, the receiver mixers RA and RB each produce a comparison signal at frequency fD, the phase difference between the two comparison signals depending on the distance D and on the delay caused by passage through the respective amplifier and filters at each receiver mixer. The delays after mixing in the respective receiver mixers are substantially constant, being dependent on the IF frequency and the difference frequency fD only. These do not change when the pattern frequency fm is changed. The delays before mixing are dependent on the frequency fm as well as on the distance D and therefore change with changes in fm. This property is used to eliminate the effect of instrumental delays, as described hereinafter.

The phase difference between the two comparison signals cannot as yet be measured since the two stations A and B are separated by the distance D. To obtain the requisite measurement, the comparison signal obtained from the receiver mixer RB is transmitted to station A by means of a separate transmitter/receiver link LT, LR, with LT being located at station B and LR being located at station A. In practice this link is usually provided by a sub-carrier modulated on the carrier fcB, the sub-carrier itself being modulated by the comparison signal output of the receiver mixer RB, and a separate demodulator associated with the receiver mixer RA to demodulate the detected sub-carrier and to recover the comparison signal transmitted from station B to station A. The phase difference between the two comparison signals can now be measured at station A in a phase comparator PC. This technique is described in the aforementioned U.S. Pat. No. 2,907,999.

Figure 2:
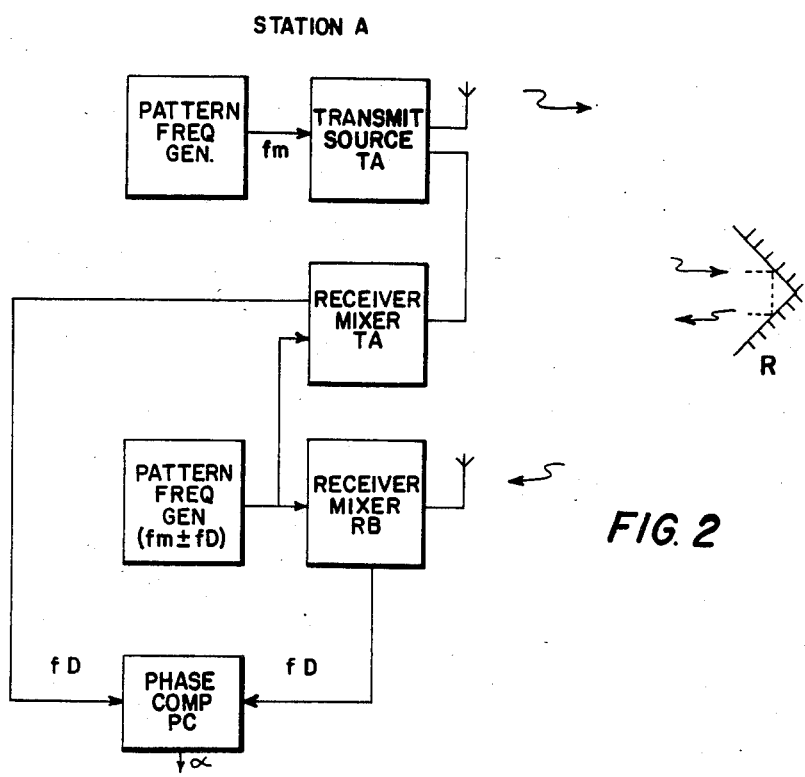
FIG. 2 shows, in block diagram form, another type of continuous wave electromagnetic distance measuring system suitable for operation in accordance with the invention.

Referring now to FIG. 2, there is shown a system which, in essence, is the same as that of FIG. 1 except that the path extending from station A to station B is 'folded' by means of a corner reflector R, with the result that stations A and B now coincide (in this embodiment referred to as station A). The path length being measured is now twice the distance between station A and the reflector R. Since the use of microwave frequencies for carrier waves would require a reflector of enormous size, this system is usable only if a very high carrier frequency is used, e.g. a light beam which serves as carrier for the pattern frequency fm. The merging of the two stations A and B of FIG. 1 into the one station A of FIG. 2 permits considerable simplification. Usually only the pattern signal which, in the FIG. 1 embodiment, is propagated from the transmitting source TA to the receiver RB is, in the FIG. 2 embodiment, propagated along the measuring path. Propagation, in the FIG. 1 embodiment, of the auxiliary pattern signal from the transmitting source TB to receiver RA, and transmission of the comparison signal along the LT, LR link is, in the FIG. 2 embodiment, reduced to a simple generator which provides a signal at a frequency $fm \pm fD$. The one comparison signal fD is delayed along the propagation path and is recovered in RB by beating or mixing the received light beam modulated by fm, with the locally generated $fm \pm fD$ signal. The other comparison signal fD is obtained by beating or mixing the generated fm and $fm \pm fD$ signals directly, internally in RA at station A.

The systems illustrated in FIGS. 1 and 2 both rely for their accuracy on the determination of the phase relationship between two signals at least one of which has been transmitted and is therefore contaminated with transmission noise. The signals travelling along the propagation path directly are also contaminated with signals resulting from multi-path reflections, i.e. reflections from objects alongside the propagation path. A consequence of this is that there is a limit to the accuracy to which the phase differences can be measured and the accuracy to which these measured phase differences represent the actual distance along the propagation path. Furthermore, each of these systems provides phase measurements that are affected by instrumental delays.

Instrumental delays result in errors in the phase measurements, and are caused by phase delays in the amplifier, filter, and detector circuits which follow the respective mixers where the mixing takes place. There are two methods by which instrumental delays can be eliminated. In describing these two methods below, $\alpha p$ will be used to designate that part of the phase measurement resulting from the propagation delay of the pattern signal along the propagation path and any phase delays that occur before the respective mixers, whereas $\alpha i$ will be used to designate that part of the phase measurement resulting from instrumental delays. $\alpha p$ depends on fm, whereas $\alpha i$ depends on fD and on the IF frequency. By keeping the fD and IF frequencies unchanged, $\alpha i$ can be kept constant. In one method of eliminating $\alpha i$, two phase measurements ($\alpha$(plus) and $\alpha$(minus)) are made at the same difference frequency fD, but originating from an auxiliary pattern frequency which, in the one case, is lower than the pattern frequency, and, in the other case, is higher than the pattern frequency. This has the effect of changing the direction of rotation of the phase vector $\alpha p$ with respect to changes in the transmission path but not to that of the phase vector $\alpha i$. The two measurements thus obtained yield:

$$\alpha(\text{plus}) = \alpha p + \alpha i$$

and $$\alpha(\text{minus}) = -\alpha p + \alpha i$$

Subtracting the two measurements and dividing by two provides a phase value:

$$\tfrac{1}{2}(\alpha p + \alpha i + \alpha p - \alpha i) = \alpha p$$

which is not affected by the instrumental delay $\alpha i$.

Adding the two measurements and dividing by two provides a phase value:

$$\tfrac{1}{2}(\alpha p + \alpha i - \alpha p + \alpha i) = \alpha i$$

which can be used as an instrumental zero.

In the other method of eliminating $\alpha i$, two phase measurements ($\alpha Pr$ and $\alpha Px$) are made, one at a reference frequency fPr, and the other at a pattern frequency fPx, but with fD substantially the same. The two measurements yield:

$$\alpha Pr = \alpha p(1) + \alpha i$$

and $$\alpha Px = \alpha p(2) + \alpha i$$

Subtracting the two measurements provides:

$$\alpha Pr - \alpha Px = \alpha p(1) + \alpha i - \alpha p(2) - \alpha i = \alpha p(1) - \alpha p(2)$$

The resulting phase measurement is equal to the phase delay that would be experienced by a signal of measuring frequency $$fMx = fPr - fPx$$

without being affected by instrumental delays.

In practice, both the above methods of eliminating $\alpha i$ are used. The first method is normally used to eliminate $\alpha i$ from the phase measurement corresponding to the highest measuring frequency. The second method is used to eliminate $\alpha i$ from the phase measurements corresponding to the lower measuring frequencies. The highest measuring frequency is often selected as the reference frequency. The wavelength corresponding to the measuring frequency is, in this context, also referred to as the differential wavelength ($\lambda d$).

Although further reference will now be made to the system described in FIGS. 1 and 3, it will be appreciated that the description will also, with suitable modification, apply to the system illustrated in FIG. 2.

Figure 3:
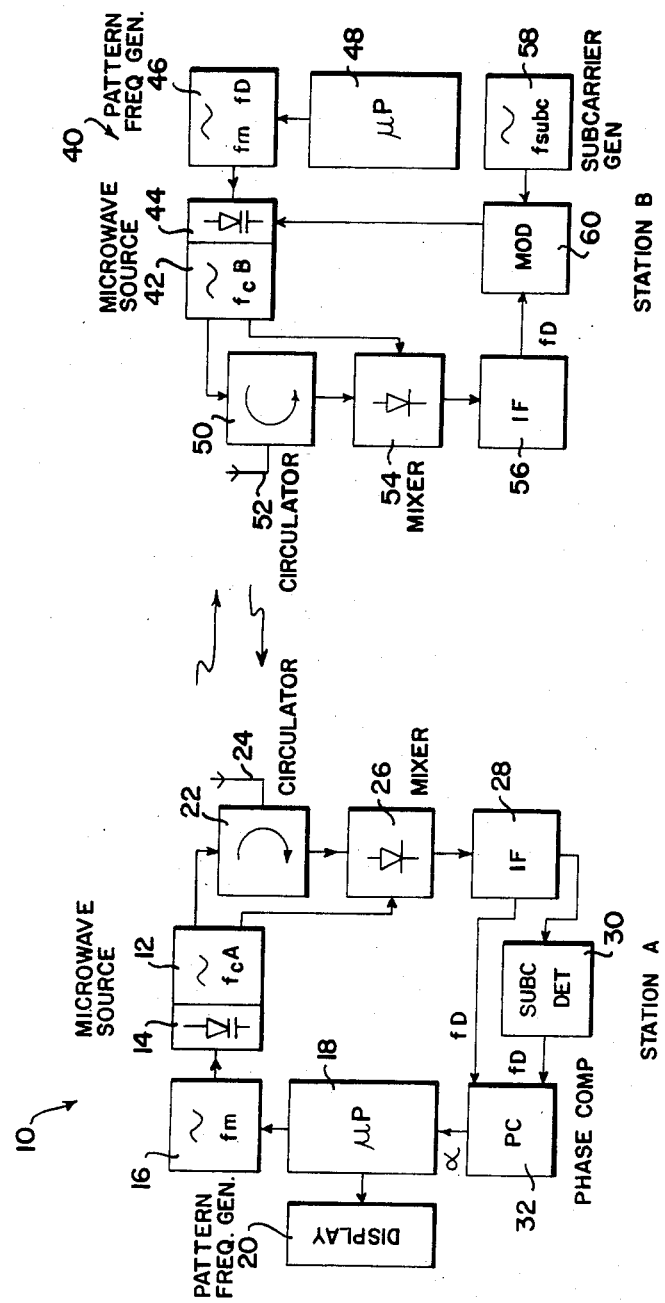
FIG. 3 is a more detailed block diagram of the system illustrated in FIG. 1.

Referring now to FIG. 3, reference numeral 10 generally indicates, in block diagram form, the circuitry of station A. The link LT, LR of FIG. 1 is, in FIG. 3, provided by a sub-carrier modulated on the carrier fcB. The circuitry 10 comprises means 12 for generating a microwave carrier signal at frequency fcA, means 14 for tuning the means 12 and modulating the carrier fcA, a frequency synthesiser 16 for generating any selected one of a number of accurately known pattern frequencies, a suitably programmed microprocessor 18 for controlling the operation of the synthesiser 16, display means 20 for displaying the measurements made, means 22 for permitting transmission and reception of signals by a common antenna 24, a mixer 26 for mixing the received signal with the local oscillator bias, an IF amplifier and detector 28 for detecting the first comparison signal at frequency fD and the sub-carrier modulation, a demodulator 30 for demodulating the sub-carrier to produce a second comparison signal, also at frequency fD, and a phase comparator 32 for phase comparing the two comparison signals to produce a phase measurement α.

Reference numeral 40 generally indicates, in block diagram form, the circuitry of station B. The circuitry 40 comprises means 42 for generating a microwave carrier signal at frequency fcB, means 44 for tuning the means 42 and modulating the carrier fcB, a frequency synthesiser 46 for generating the requisite auxiliary pattern frequencies, a suitably programmed microprocessor 48 for controlling the operation of the synthesiser 46, means 50 for permitting transmission and reception of signals by a common antenna 52, a mixer 54 for mixing the received signal with the local oscillator bias, an IF amplifier and detector 56 for detecting the second comparison signal fD, an oscillator 58 for generating a sub-carrier signal, and a modulator 60 in which the sub-carrier signal is modulated by the second comparison signal fD. The modulated sub-carrier produced by the modulator 60 is fed to the means 42, where it is modulated on the carrier fcB.

The microprocessors 18 and 48 are suitably programmed to step the associated synthesisers 16 and 46 respectively through a sequence of frequencies which are required for the necessary measuring operations, an example of which will hereinafter be described with reference to table B. The microprocessors 18 and 48 are further suitably programmed to provide each phase measurement as an average over a predetermined averaging time. Averaging may take place in an analogue manner, by digital processing of data in the microprocessors, or partly in an analogue manner and partly by digital processing in the microprocessors. The microprocessor 18 is still further suitably programmed to provide, from a sequence of phase measurements, an indication of the distance D.

Tables A and B at the end of this specification show a comparison between a typical conventional system (table A) and a system which is operated in accordance with the invention (table B). The distance D being measured extends between a static station (station S) and a mobile station (station M), and the phase measurements are made at station S. Each table shows a sequence of phase measurements which are required to resolve the distance unambiguously to greater than 100 km under dynamic conditions, followed (after the double horizontal line in the table) by a sequence of phase measurements made when the system operates in a mode (referred to as the tracking mode) effective to track the moving station once the ambiguities have been resolved. In the tracking mode the ambiguity factor n, once determined, is updated by carries or borrows for each full cycle of phase increase or decrease, as the case may be, measured in the tracking mode.

The first column in each table lists the sequential number of each phase measurement, and the second column lists the time which, at the end of the particular measurement, has elapsed since the start of the sequence of measurements. The third column lists the pattern frequencies generated at the station S, and the fourth column the auxiliary pattern frequencies generated at the station M. The highest pattern frequency is referred to as fm and this is also used as the reference frequency. The other pattern frequencies are shown as referred to the reference frequency (fm) of the system, and are shown in such a way that it is clear how they depend on fm and β.

The fifth column lists the measuring or differential frequencies and the sixth column their wavelengths. In relating the values of frequency and wavelength, a propagation speed of $3 \times 10^8$ m/sec is assumed.

The basic parameters for the two systems are listed at the head of the respective tables. The switch-over time for switching from one pattern frequency to the next has been taken into account in table B and has been assumed to be 2.5 ms. In table A the switch-over time has been neglected, being of little account relative to the averaging time of 250 ms in the system of table A.

In comparing the two systems, it is to be noted that the fm value for the system of table A is 1.5 MHz, giving a wavelength λ of 100 m, while for the system of table B the fm value is 15 MHz, giving a wavelength λ of 10 m.

In the system of table A, where β is 0.1, the worst case error in α should not exceed 0.05 if a breakdown in ambiguity resolution is to be avoided. It is assumed that, with an averaging time of 250 ms, the maximum error in α due to noise is 0.01. This leaves a margin of 0.04 for errors due to other causes such as multi-path reflections. In the system of table B, where β is 0.5, the worst case error in α should not exceed 0.25. By reducing the averaging time 100 fold (from 250 ms to 2.5 ms), the maximum error in α due to noise is reduced $\sqrt{100}=10$ fold, i.e. from 0.01 to 0.1 (assuming the noise conditions to be equal). This leaves a margin of 0.15 for errors due to other causes, which is in excess of the expected increase in the multi-path error resulting from the increase in β. Accordingly, the system of table B has a greater tolerance to errors caused by multi-path reflections than has the system of table A.

If no allowance were to be made for errors resulting from multi-path reflections, a 5-fold increase in β (from 0.1 to 0.5) would enable the system to tolerate a 5-fold reduction in accuracy and hence make possible a 25-fold reduction in the averaging time. The less than proportional increase in the expected multi-path error will account for the fact that there is a 100-fold instead of a 25-fold reduction in the averaging time.

In the table B system the switch-over time (2.5 ms) is significant in relation to the averaging time (also 2.5 ms) and therefore has to be taken into account in arriving at the time taken per phase measurement (5 ms). In this example there is little point in reducing the averaging time to less than 2.5 ms as this would no longer significantly reduce the time taken per phase measurement.

The high value of β in the system of table B is responsible both for the large number of phase measurements required to resolve the distance D to beyond 100 km unambiguously, and for the short averaging times. However, even with the large number of measurements, the overall time taken by the system of table B to resolve the ambiguities is only 155 ms, i.e. less than the time taken in the system of table A for one phase measurement. The resolution of distance in the system of table A for an error in α of 0.01 is $0.01 \times 100$ m = 1 m, whereas, in the system of table B, for an error in α of 0.1, the resolution of distance is $0.1 \times 10$ m = 1 m. However, in the time that the system of table A takes to produce one single measurement of α, the system of table B produces 25 measurements and this improves the statistical average by $\sqrt{25}$, resulting in a resolution for the system of table B of 0.2 m, noise conditions being equal, as compared to the 1 m for the system of table A.

The maximum relative speed under which the system of table A can resolve ambiguities, assuming that there is no relative acceleration, is 0.5 λ per 500 ms, or 100 m/sec. For the system of table B this figure is 0.5 λ per 10 ms, or 500 m/sec. The tolerance of the system of table B to relative acceleration is several orders of magnitude better than that of the system of table A. It must be borne in mind that even when tracking or measuring to a station moving at a constant speed, the relative speed can show high values of acceleration, as will be clear when considering the case of an aircraft station overflying a static measuring station where, in a very short time, the relative speed reverses in sign.

Systems according to the invention do not only benefit when the measurement of distance takes place under dynamic conditions, but they also benefit when the measurement of distance takes place under static conditions. This is so because they are able to provide an increased measuring speed and/or increased maximum range, and reduce the sensitivity to errors resulting from multi-path reflections, thereby to reduce the incidence of errors in the resolution of ambiguities due to multi-path reflections. Such incidences, if they occur, can produce enormous errors so that the reduced risk of their occurrence will be advantageous.

The measurements shown in Table B, which, under dynamic conditions, are used for dynamic tracking, i.e. for the updating of the ambiguity factor n, may, under static conditions be used for static averaging, i.e. for improving the accuracy of the distance measurement through obtaining an average of a number of successive phase measurements.

The measuring process for eliminating the effect of instrumental errors and for resolving ambiguities in the distance measuring systems illustrated in FIG. 2 is very much the same as that described with reference to FIG. 1, so that the system of FIG. 2 will equally benefit from operation in accordance with the invention as described above with reference to FIG. 1.

It is to be understood that reference herein to a phase measurement refers to the difference in phase between two sinusoidally varying signals.

TABLE A
TYPICAL CONVENTIONAL SYSTEM

PARAMETERS
Reference frequency and wavelength: 1,5 MHz and 100 m
$\beta$: 0,1
Max. Ambiguity free range: 100 km
Averaging time per $\alpha$ measurement 250 ms Switchover time for fm neglected
$\alpha$ error due to worst case noise: 0,01
Max. allowable $\alpha$ error: 0,05 (all causes)
Speed of propagation: 300 000 km/s

| $\alpha$ meas. no. | time from start (ms) | Pattern freq. at Station S | Auxiliary Pattern freq. at Station M | Measuring frequency | Wavelength $\lambda$ or $\lambda_d$ | REMARKS |
|---|---|---|---|---|---|---|
| 1 | 250 | fm | fm − fD | fm | 100 m | Ref. |
| 2 | 500 | fm | fm + fD | fm | 100 m | Inst. zero |
| 3* | 750 | fm | fm − fD | fm | 100 m | ref. |
| 4 | 1000 | fm(1 − 0,1) | fm(1 − 0,1) − fD | 0,1 fm | 1000 m | ambig. |
| 5* | 1250 | fm | fm − fD | fm | 100 m | ref. |
| 6 | 1500 | fm(1 − (0,1)²) | fm(1 − (0,1)²) − fD | (0,1)² fm | 10 km | ambig. |
| 7* | 1750 | fm | fm − fD | fm | 100 m | ref. |
| 8 | 2000 | fm(1 − (0,1)³) | fm(1 − (0,1)³) − fD | (0,1)³ fm | 100 km | ambig. |
| 9* | 2250 | fm | fm − fD | fm | 100 m | ref. |
| 10 | 2500 | fm | fm + fD | 0/fm | 0/100 m | dynamic tracking |
| 11 | 2750 | fm | fm − fD | 0/fm | 0/100 m | or |
| 12 | 3000 | fm | fm + fD | 0/fm | 0/100 m | static averaging |
| 13 | 3250 | fm | fm − fD | 0/fm | 0/100 m | |
| 14 | and so on ... | — | — | — | | |

*These measurements can be omitted if distance is known to be constant

TABLE B
SYSTEM ACCORDING TO INVENTION

PARAMETERS
Reference Frequency fm and wavelength: 15 MHz and 10 m
$\beta$: 0,5
Max. Ambiguity-free range: 163,84 km
Averaging time per $\alpha$ measurement 2,5 ms. Switchover time for fm: 2,5 ms
$\alpha$ error due to worst case noise: 0,1
Max. allowable $\alpha$ error: 0,25 (all causes)
Speed of propagation: 300 000 km/s

| $\alpha$ meas. no. | time from start (ms) | Pattern frequency at Station S | Auxiliary Pattern frequency at Station M | Measuring frequency | Wavelength $\lambda$ or $\lambda_d$ | REMARKS |
|---|---|---|---|---|---|---|
| 1 | 5 | fm | fm − fD | fm | 10 m | ref. |
| 2 | 10 | fm | fm + fD | fm | 10 m | inst. zero |
| 3* | 15 | fm | fm − fD | fm | 10 m | ref. |
| 4 | 20 | fm(1 − (0,5)) | fm(1 − 0,5)) − fD | 0,5 fm | 20 m | ambig. |
| 5* | 25 | fm | fm − fD | fm | 10 m | ref. |
| 6 | 30 | fm(1 − (0,5)²) | fm(1 − (0,5)²) − fD | (0,5)² fm | 40 m | ambig. |
| 7* | 35 | fm | fm − fD | fm | 10 m | ref. |
| 8 | 40 | fm(1 − (0,5)³) | fm(1 − (0,5)³) − fD | (0,5)³ fm | 80 m | ambig. |
| 9* | 45 | fm | fm − fD | fm | 10 m | ref. |
| 10 | 50 | fm(1 − (0,5)⁴) | fm(1 − (0,5)⁴) − fD | (0,4)⁴ fm | 160 m | ambig. |
| 11* | 55 | fm | fm − fD | fm | 10 m | ref. |

TABLE B-continued

SYSTEM ACCORDING TO INVENTION

PARAMETERS
Reference Frequency fm and wavelength: 15 MHz and 10 m
$\beta$: 0,5
Max. Ambiguity-free range: 163,84 km
Averaging time per $\alpha$ measurement 2,5 ms. Switchover time for fm: 2,5 ms
$\alpha$ error due to worst case noise: 0,1
Max. allowable $\alpha$ error: 0,25 (all causes)
Speed of propagation: 300 000 km/s

| $\alpha$ meas. no. | time from start (ms) | Pattern frequency at Station S | Auxiliary Pattern frequency at Station M | Measuring frequency | Wavelength $\lambda$ or $\lambda d$ | REMARKS |
|---|---|---|---|---|---|---|
| 12 | 60 | $fm(1 - (0,5)^5)$ | $fm(1 - (0,5)^5) - fD$ | $(0,5)^5$ fm | 320 m | ambig. |
| 13* | 65 | fm | fm $-$ fD | fm | 10 m | ref. |
| 14 | 70 | $fm(1 - (0,5)^6)$ | $fm(1 - (0,5)^6) - fD$ | $(0,5)^6$ fm | 640 m | ambig. |
| 15* | 75 | fm | fm $-$ fD | fm | 10 m | ref. |
| 16 | 80 | $fm(1 - (0,5)^7)$ | $fm(1 - (0,5)^7) - fD$ | $(0,5)^7$ fm | 1,28 km | ambig. |
| 17* | 85 | fm | fm $-$ fD | fm | 10 m | ref. |
| 18 | 90 | $fm(1 - (0,5)^8)$ | $fm(1 - (0,5)^8) - fD$ | $(0,5)^8$ fm | 2,56 km | ambig. |
| 19* | 95 | fm | fm $-$ fD | fm | 10 m | ref. |
| 20 | 100 | $fm(1 - (0,5)^9)$ | $fm(1 - (0,5)^9) - fD$ | $(0,5)^9$ fm | 5,12 km | ambig. |
| 21* | 105 | fm | fm $-$ fD | fm | 10 m | ref. |
| 22 | 110 | $fm(1 - (0,5)^{10})$ | $fm(1 - (0,5)^{10}) - fD$ | $(0,5)^{10}$ fm | 10,24 km | ambig. |
| 23* | 115 | fm | fm $-$ fD | fm | 10 m | ref. |
| 24 | 120 | $fm(1 - (0,5)^{11})$ | $fm(1 - (0,5)^{11}) - fD$ | $(0,5)^{11}$ fm | 20,48 km | ambig. |
| 25* | 125 | fm | fm $-$ fD | fm | 10 m | ref. |
| 26 | 130 | $fm(1 - (0,5)^{12})$ | $fm(1 - (0,5)^{12}) - fD$ | $(0,5)^{12}$ fm | 40,96 km | ambig. |
| 27* | 135 | fm | fm $-$ fD | fm | 10 m | ref. |
| 28 | 140 | $fm(1 - (0,5)^{13})$ | $fm(1 - (0,5)^{13}) - fD$ | $(0,5)^{13}$ fm | 81,92 km | ambig. |
| 29* | 145 | fm | fm $-$ fD | fm | 10 m | ref. |
| 30 | 150 | $fm(1 - (0,5)^{14})$ | $fm(1 - (0,5)^{14}) - fD$ | $(0,5)^{14}$ fm | 163,84 km | ambig. |
| 31* | 155 | fm | fm $-$ fD | fm | 10 m | ref. |
| 32 | 160 | fm | fm $+$ fD | 0/fm | 0/10 m | dynamic tracking |
| 33 | 165 | fm | fm $-$ fD | 0/fm | 0/10 m | or |
| 34 | 170 | fm | fm $+$ fD | 0/fm | 0/10 m | static averaging |
| 35 | 175 | and so on | — | — | — | |

*These measurements can be omitted if distance is known to be constant

I claim:

1. A method of continuous wave electromagnetic distance measurement or positioning, which comprises:
obtaining successively a series of primary phase measurements, each primary phase measurement being obtained by:
generating a pattern signal having an accurately known pattern frequency;
generating an auxiliary pattern signal having a frequency which differs from the pattern frequency by a predetermined off-set frequency;
causing at least the pattern signal to be propagated electromagnetically;
mixing the pattern signal and the auxiliary pattern signal with one another before and after said propagation, thereby to provide two comparison signals each having a frequency equal to the off-set frequency; and
carrying out a phase measuring operation on the two comparison signals to provide said primary phase measurement as the phase difference between the two comparison signals; and
combining the primary phase measurements of each of a plurality of selected pairs of the primary phase measurements in such a manner as to produce a secondary phase measurement in which any instrumental phase error incorporated in the respective primary phase measurements is substantially eliminated, each secondary phase measurement corresponding to a measuring frequency which is determined by the pattern and auxiliary pattern frequencies at which the primary phase measurements of the respective pair are obtained;
the pattern and auxiliary pattern frequencies and said pairs of primary phase measurements being selected in such a manner that the distance can be derived from the secondary phase measurements unambiguously to the wavelength of the lowest measuring frequency and to an accuracy equal to a fraction of the wavelength of the highest measuring frequency;
the pattern and auxiliary pattern frequencies and said pairs of primary phase measurements being selected in such a manner further that at least one of said measuring frequencies (other than the highest) is related to the next higher measuring frequency by a multiplying factor $\beta$ which lies within the following range:

$1 > \beta > \frac{1}{4}$; and each primary phase measurement being obtained as an average value over an averaging time, the averaging time for at least some of the primary phase measurements being less than 75 ms.

2. A method according to claim 1, wherein the pattern and auxiliary pattern frequencies and said selected pairs of primary phase measurements are selected in such a manner that substantially all of said measuring frequencies (other than the highest) are each related to the next higher measuring frequency by a multiplying factor $\beta$ which lies within said range.

3. A method according to claim 1, wherein the multiplying factor lies within the following range:

$1 > \beta \geq \frac{1}{4}$.

4. A method according to claim 3, wherein $\beta = \frac{1}{2}$.

5. A method according to claim 1, wherein the averaging time for said at least some of the phase measurements is less than 40 ms.

6. A method according to claim 1, wherein the averaging time for each of substantially all the primary phase measurements is less than 75 ms.

7. A method according to claim 7, wherein the averaging time for each of said substantially all the primary phase measurements is less than 40 ms.

8. Continuous wave electromagnetic distance measuring or positioning apparatus which comprises:

control means;

first generating means responsive to the control means for generating a pattern signal having any selected one of a series of accurately known pattern frequencies;

second generating means responsive to the control means for generating an auxiliary pattern signal having a frequency which differs from the selected pattern frequency by a predetermined off-set frequency;

means for transmitting the pattern signal so as to be propagated electromagnetically;

means for receiving the pattern signal after said propagation;

means for mixing the pattern signal and the auxiliary pattern signal with one another before and after said propagation, thereby to provide two comparison signals each having a frequency equal to the off-set frequency; and phase measuring and averaging means for carrying out a phase measuring operation on the two comparison signals to provide a primary phase measurement representative of the average phase difference between the two comparison signals over a predetermined averaging period;

the control means being operative:

to cause the first generating means to generate successively a plurality of pattern signals each having a selected one of said pattern frequencies, and to cause the second generating means to generate the corresponding auxiliary pattern signal;

to provide at least some of the resulting primary phase measurements as an average over an averaging period of less than 75 ms;

to combine the primary phase measurements of each of a plurality of selected pairs of the resulting primary phase measurements in such a manner as to produce a secondary phase measurement in which any instrumental phase error incorporated in the respective primary phase measurements is substantially eliminated, each secondary phase measurement corresponding to a measuring frequency which is determined by the pattern and auxiliary pattern frequencies at which the primary phase measurements of the respective pair are obtained;

to select the pattern and auxiliary pattern frequencies and said pairs of primary phase measurements in such a manner that the distance can be derived from the secondary phase measurements unambiguously to the wavelength of the lowest measuring frequency and to an accuracy equal to a fraction of the wavelength of the highest measuring frequency; and to select the pattern and auxiliary pattern frequencies and said pairs of primary phase measurements in such a manner further that at least one of said measuring frequencies (other than the highest) is related to the next higher measuring frequency by a multiplying factor $\beta$ which lies within the following range:

$$1 > \beta > \tfrac{1}{4}.$$

9. Apparatus according to claim 8, wherein the control means is in the form of a suitably programmed digital data processor.

10. Continuous wave electromagnetic distance measuring or positioning apparatus which comprises:

control means;

first generating means responsive to the control means for generating a pattern signal having any selected one of a series of accurately known pattern frequencies;

second generating means responsive to the control means for generating an auxiliary pattern signal having a frequency which differs from the selected pattern frequency by a predetermined off-set frequency;

means for transmitting the pattern signal so as to be propagated electromagnetically; means for receiving the pattern signal after said propagation;

means for mixing the pattern signal and the auxiliary pattern signal with one another before and after said propagation, thereby to provide two comparison signals each having a frequency equal to the off-set frequency; and phase measuring and averaging means for carrying out a phase measuring operation on the two comparison signals to provide a primary phase measurement representative of the average phase difference between the two comparison signals over a predetermined averaging period;

the control means being operative:

to cause the first generating means to generate successively a plurality of pattern signals each having a selected one of said pattern frequencies, and to cause the second generating means to generate the corresponding auxiliary pattern signal;

to provide at least some of the resulting primary phase measurements as an average over an averaging period of less than 75 ms;

to combine the primary phase measurements of each of a plurality of selected pairs of the resulting primary phase measurements in such a manner as to produce a secondary phase measurement in which any instrumental phase error incorporated in the respective primary phase measurements is substantially eliminated, each secondary phase measurement corresponding to a measuring frequency which is determined by the pattern and auxiliary pattern frequencies at which the primary phase measurements of the respective pair are obtained; to select the pattern and auxiliary pattern frequencies and said pairs of primary phase measurements in such a manner that the distance can be derived from the secondary phase measurements unambiguously to the wavelength of the lowest measuring frequency and to an accuracy equal to a friction of the wavelength of the highest measuring frequency; and to select the pattern and auxiliary pattern frequencies and said pairs of primary phase measurements in such a manner further that at least one of said measuring frequencies (other than the highest) is related to the next higher measuring frequency by a multiplying factor $\beta = \tfrac{1}{2}$.

* * * * *